US012784357B2

(12) United States Patent
Aoyagi et al.

(10) Patent No.: US 12,784,357 B2
(45) Date of Patent: Nov. 3, 2026

(54) MAP GENERATION DEVICE, NON-TRANSITORY COMPUTER READABLE STORAGE MEDIUM, AND MAP GENERATION SYSTEM

(71) Applicant: Mitsubishi Electric Corporation, Tokyo (JP)

(72) Inventors: Takahisa Aoyagi, Tokyo (JP); Tetsuro Nishioka, Tokyo (JP); Takuya Taniguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 141 days.

(21) Appl. No.: 18/621,217

(22) Filed: Mar. 29, 2024

(65) Prior Publication Data

US 2024/0394974 A1 Nov. 28, 2024

(30) Foreign Application Priority Data

May 22, 2023 (JP) ................................ 2023-083560

(51) Int. Cl.
*G06T 17/05* (2011.01)
*G01C 21/00* (2006.01)
(Continued)

(52) U.S. Cl.
CPC .......... *G06T 17/05* (2013.01); *G01C 21/3635* (2013.01); *G01C 21/3804* (2020.08); *G06T 7/20* (2013.01)

(58) Field of Classification Search
CPC ....... G06T 17/05; G06T 7/20; G01C 21/3804; G01C 21/3635
See application file for complete search history.

(56) References Cited

U.S. PATENT DOCUMENTS 11,507,101 B2 11/2022 Lee et al.
2020/0218276 A1* 7/2020 Lee ..................... G06N 3/0499
(Continued)

FOREIGN PATENT DOCUMENTS

JP 2016-170308 A 9/2016
JP 2021-114169 A 8/2021
JP 2023-47584 A 4/2023

OTHER PUBLICATIONS

Japanese Office Action dated Oct. 7, 2025 in Application No. 2023-083560.

*Primary Examiner* — Yi Yang
(74) *Attorney, Agent, or Firm* — Sughrue Mion, PLLC

(57) ABSTRACT

For generating a dynamic map without impairing real-time properties, provided are: an identification unit identifying whether information for dynamic map generation acquired from a sensor includes three-dimensional information and whether the information for dynamic map generation is information regarding a tracking target object; a first conversion unit converting the information for dynamic map generation identified by the identification unit into information for map generation after two-dimensional conversion; a tracking unit tracking the tracking target object in a two-dimensional space based on the information for map generation after two-dimensional conversion and extracting information for map generation after two-dimensional conversion regarding the tracking target object that has moved; a second conversion unit converting the information for map generation after two-dimensional conversion into information for map generation after three-dimensional conversion; and a map generation unit generating dynamic map based on the information for map generation after three-dimensional conversion.

12 Claims, 6 Drawing Sheets

(51) Int. Cl.
*G01C 21/36* (2006.01)
*G06T 7/20* (2017.01)

(56) References Cited

U.S. PATENT DOCUMENTS

2022/0004777 A1* 1/2022 Yang ........................ G01S 19/20
2023/0130901 A1* 4/2023 Li .......................... G01C 21/32
701/450

* cited by examiner

MAP GENERATION DEVICE, NON-TRANSITORY COMPUTER READABLE STORAGE MEDIUM, AND MAP GENERATION SYSTEM

TECHNICAL FIELD

The present disclosure relates to a map generation device, a non-transitory computer readable storage medium, and a map generation system that generate a dynamic map.

BACKGROUND ART

In recent years, various services using map information have been provided. One of them is, for example, automatic driving or advanced driving using a dynamic map.

The dynamic map is a digital map generated by associating various information related to road traffic such as information of surrounding vehicles or traffic information with a high-precision three-dimensional map in real time.

For example, a vehicle capable of automatic driving performs automatic driving control while comparing information on the dynamic map with information detected by a sensor mounted on the vehicle. It is important for a vehicle capable of automatic driving to accurately grasp a position or a type of an object present in the real world and a change in a time-series motion of the object on the basis of the dynamic map. For this purpose, it is important that the content of the dynamic map is a content that captures a change in time-series motion of an object detected in the real world and is brought close to information in the real world.

As a technique for capturing a change in time-series motion of an object detected in the real world, for example, Patent Literature 1 discloses a technique for acquiring spatial information of a three-dimensional space detected using at least one sensor over time, identifying at least one object in the three-dimensional space, and tracking the sensed three-dimensional space including the identified at least one object.

CITATION LIST

Patent Literature

Patent Literature 1: U.S. patent Ser. No. 11/507,101

SUMMARY OF INVENTION

Technical Problem

In the conventional technique, in tracking an object in a three-dimensional space, spatial information of the three-dimensional space is acquired over time, and thus an amount of information for tracking increases. In particular, in a case where there are a large number of objects to be tracked, the CPU processing capacity is tight.

When a dynamic map is generated using a technique such as the conventional technique, there is a problem that real-time properties in a system using a dynamic map may be impaired, such as causing a delay in generation and provision of the dynamic map.

The present disclosure has been made to solve the above problem, and an object of the present disclosure is to provide a map generation device capable of generating a dynamic map without impairing real-time properties.

Solution to Problem

A map generation device according to the present disclosure includes processing circuitry to acquire, from at least one sensor that detects an object present in a target region, information on the object detected by the at least one sensor as information for dynamic map generation for generating a dynamic map, and identify whether or not the information for dynamic map generation acquired includes three-dimensional information and whether or not the information for dynamic map generation acquired is information regarding a tracking target object whose motion needs to be tracked, to convert the information for dynamic map generation identified by the processing circuitry as the information for dynamic map generation including the three-dimensional information and the information for dynamic map generation regarding the tracking target object into information for map generation after two-dimensional conversion that is two-dimensional space information, to track the tracking target object in a two-dimensional space on a basis of the information for map generation after two-dimensional conversion converted by the processing circuitry and extract the information for map generation after two-dimensional conversion regarding the tracking target object that has moved, to convert the information for map generation after two-dimensional conversion extracted by the processing circuitry into information for map generation after three-dimensional conversion that is three-dimensional space information, and to generate the dynamic map on a basis of the information for map generation after three-dimensional conversion converted by the processing circuitry.

Advantageous Effects of Invention

According to the present disclosure, the map generation device can generate the dynamic map without impairing the real-time property.

DESCRIPTION OF EMBODIMENTS

Hereinafter, an embodiment of the present disclosure will be described in detail with reference to the drawings.

First Embodiment

Figure 1:
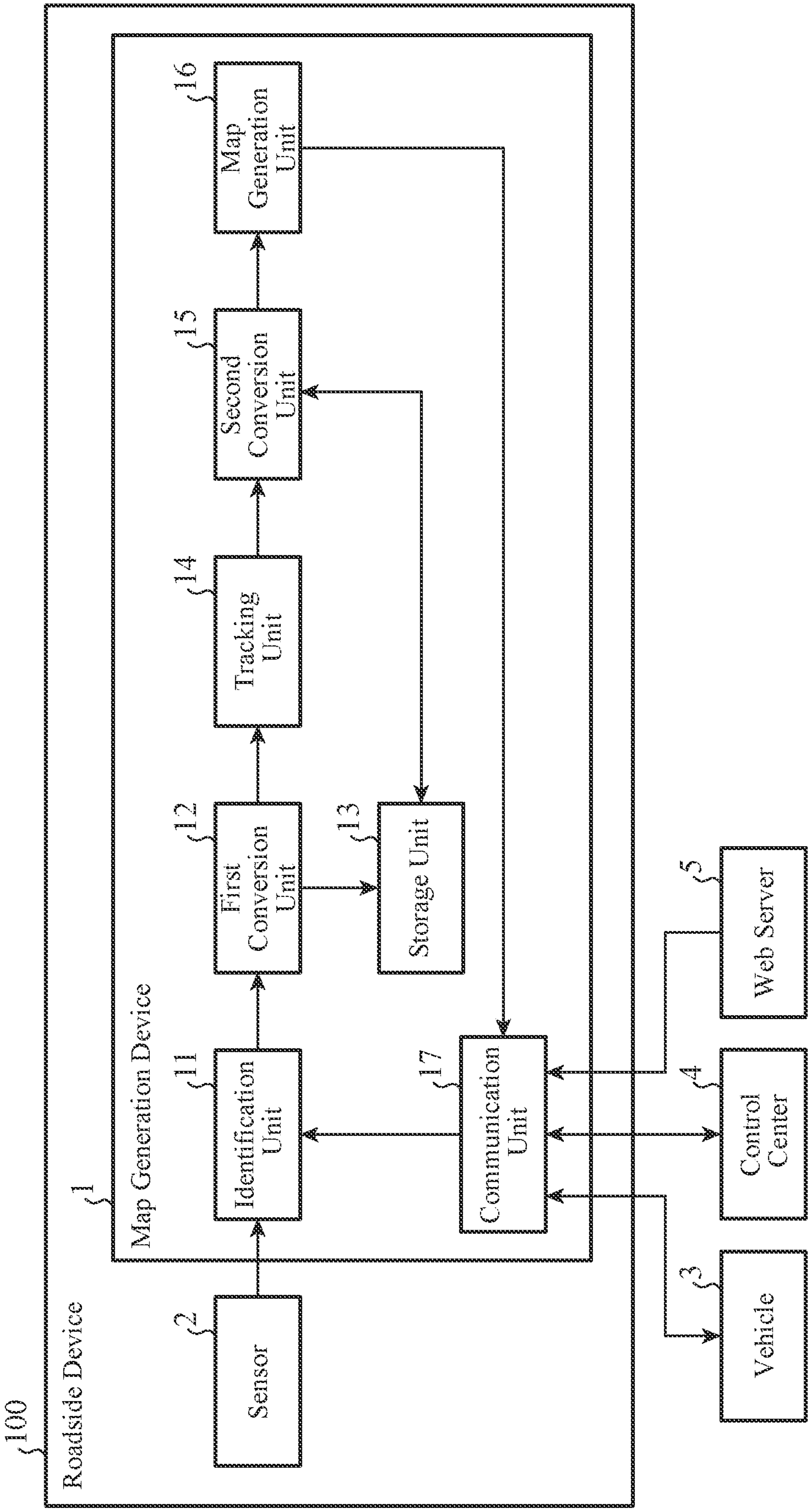
FIG. 1 is a diagram illustrating a configuration example of a map generation device according to a first embodiment.

FIG. 1 is a diagram illustrating a configuration example of a map generation device 1 according to a first embodiment.

The map generation device 1 according to the first embodiment is mounted on, for example, a roadside device 100 installed on a roadside.

The map generation device 1 acquires information (hereinafter, referred to as "information for dynamic map generation") for generating a dynamic map from a sensor 2, a vehicle 3, a control center 4, and a web server 5, and generates the dynamic map. Note that, in the first embodiment, it is assumed that a dynamic map is already present and is stored in a place that can be referred to by the map generation device 1. In the first embodiment, the generation of a dynamic map by the map generation device 1 includes update of contents of the dynamic map that is already present.

The map generation device 1 outputs the generated dynamic map to the vehicle 3.

Here, first, the dynamic map will be described.

The dynamic map is a digital map generated by associating various pieces of information related to road traffic such as information of surrounding vehicles or traffic information in real time with a high-precision three-dimensional map on which the vehicle 3 can identify the position of the vehicle 3 related to the road or the periphery thereof at a lane level.

The dynamic map is used in automatic driving or advanced driving. Specifically, for example, the vehicle 3 performs the automatic driving control while comparing information on the dynamic map with information acquired from the sensor 2 (not illustrated in FIG. 1) mounted on the vehicle 3. The vehicle 3 travels while comparing various pieces of information associated in real time on the dynamic map with the information acquired from the sensor 2, so that it is possible to accurately identify the position of the vehicle 3 or detect an obstacle or the like immediately, and to perform smooth travel based on prediction. Note that the vehicle 3 is assumed to be a vehicle capable of automatic driving (hereinafter, referred to as an "automatic driving vehicle").

The dynamic map includes static information, semi-static information, semi-dynamic information, and dynamic information. That is, the information for dynamic map generation includes static information, semi-static information, semi-dynamic information, and dynamic information.

The static information is high-precision three-dimensional map information. The high-precision three-dimensional map information includes road surface information, lane information, building position information, and the like.

The semi-static information includes information regarding a schedule of traffic regulations, information regarding a schedule of road construction, wide area weather forecast information, or the like.

The semi-dynamic information includes accident information, traffic congestion information, traffic regulation information, road construction information, narrow area weather forecast information, or the like.

The dynamic information includes surrounding vehicle information, pedestrian information, signal information, or the like.

The dynamic map is generated by associating semi-static information, semi-dynamic information, and dynamic information with high-precision three-dimensional map information that is static information. Note that an association rule for associating the semi-static information, the semi-dynamic information, and the dynamic information with the high-precision three-dimensional map information is set in advance.

The dynamic information is frequently reflected in the dynamic map. The reflection frequency of the dynamic information is very high, such as once a second. That is, the dynamic information is information that needs to be reflected in real time in the dynamic map. For example, when the dynamic information is not reflected in the dynamic map in real time, the dynamic map indicates information different from the real world. As a result, for example, the vehicle 3 cannot perform correct automatic driving control.

Although the semi-dynamic information is not as frequently reflected in the dynamic map as the dynamic information, the semi-dynamic information is highly reflected in the dynamic map.

On the other hand, the semi-static information and the static information are less frequently reflected in the dynamic map than the dynamic information and the semi-dynamic information. The reflection frequency of the semi-static information and the static information is small, such as once a day. That is, even if the semi-static information and the static information are not reflected in real time in the dynamic map, for example, the vehicle 3 can perform the automatic driving control.

As described above, in the dynamic map, timings at which the dynamic information, the semi-dynamic information, the semi-static information, and the static information are reflected in the dynamic map are different from each other.

The map generation device 1 generates the dynamic map in which the dynamic information, the semi-dynamic information, the semi-static information, or the static information is reflected at predetermined reflection timing of the dynamic information, predetermined reflection timing of the semi-dynamic information, predetermined reflection timing of the semi-static information, and predetermined reflection timing of the static information. That is, the map generation device 1 updates the dynamic map at predetermined reflection timing of the dynamic information, predetermined reflection timing of the semi-dynamic information, predetermined reflection timing of the semi-static information, and predetermined reflection timing of the static information. The map generation device 1 outputs the generated dynamic map to the vehicle 3 each time the dynamic map is generated.

In the first embodiment, the map generation device 1 will be described assuming that the reflection timing of the dynamic information has arrived.

Figure 2:
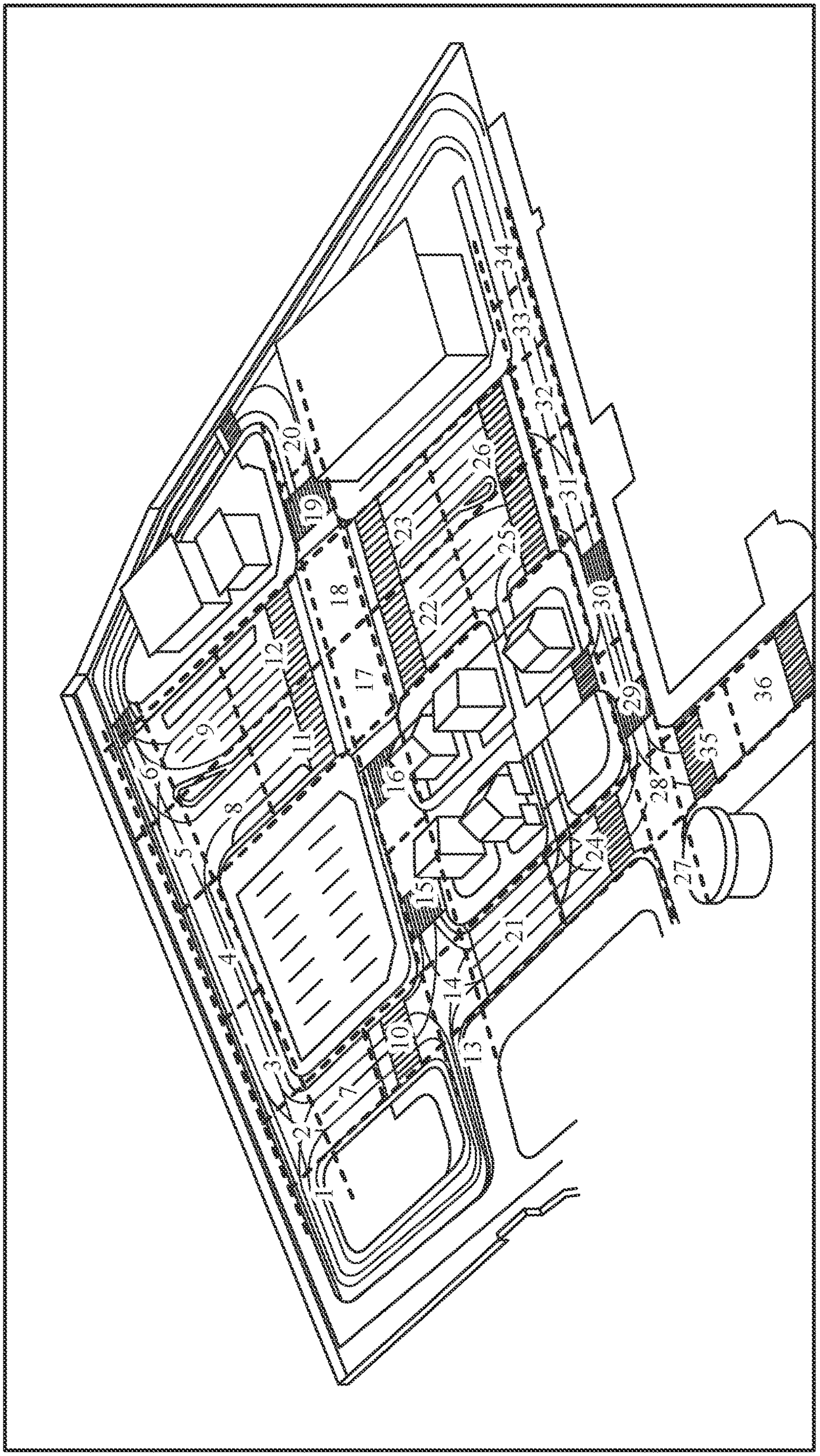
FIG. 2 is a diagram illustrating a concept of an example of a dynamic map generated by the map generation device in the first embodiment.

Here, FIG. 2 is a diagram illustrating an idea of an example of a dynamic map generated by the map generation device 1 in the first embodiment.

As illustrated in FIG. 2, in the dynamic map, a region in which the static information, the semi-static information, the semi-dynamic information, and the dynamic information need to be reflected is divided into a plurality of areas in advance.

In FIG. 2, as an example, it is assumed that a first area to a 36-th area are set in the dynamic map.

In the first embodiment, the map generation device 1 generates a dynamic map for each area.

The description returns to FIG. 1.

As illustrated in FIG. 1, the map generation device 1 is connected to the sensor 2, the vehicle 3, the control center 4, and the Web server 5.

The sensor 2 is mounted on the roadside device 100. The sensor 2 is, for example, a sensing device such as a camera, a radar, or a LiDAR.

The sensor 2 performs sensing of a region (hereinafter, referred to as a "target region") as a target for detecting an object, and detects an object present in the target region. In the first embodiment, the target region is a three-dimensional space around the roadside device 100.

The objects detected by the sensors 2 include stationary objects such as an obstacle or the like exemplified by a building, a road surface, a tree, or the like, and moving bodies such as a moving object or the like exemplified by the vehicle, a pedestrian, an animal, or the like.

The sensor 2 outputs information on the detected object (hereinafter, referred to as "object information") to the map generation device 1 as information for dynamic map generation.

Note that the sensor 2 generates object information for each detected object, and outputs the object information to the map generation device 1 as information for dynamic map generation. The object information includes information indicating a type (a type of a building, a type of a road surface, a type of a tree, a type of the vehicle 3, etc.) of the object, position information of the object, and information indicating a moving velocity of the object. The type of the object is represented by, for example, a numerical value (for example, in the case of the type of the vehicle 3, "0: an ordinary vehicle", "1: a light vehicle", "2: a truck", or the like). The position information of the object includes, for example, information regarding the position of the object in the three-dimensional space and information regarding the height of the object. The position of the object in the three-dimensional space is represented by a so-called world coordinate system. The height of the object is represented by, for example, a value of z coordinate in m units in a so-called world coordinate system indicating the position of the object. The moving velocity of the object is represented by, for example, a direction in 16 directions (a value of 0 to 15) and a speed per hour.

As described above, the object detected by the sensor 2 includes a stationary object and a moving body. That is, the object information is information regarding a stationary object, in other words, static information, or information regarding a moving body, in other words, dynamic information.

Although only the sensor 2 mounted on the roadside device 100 is illustrated in FIG. 1, a plurality of sensors 2 can be connected to the map generation device 1.

For example, the map generation device 1 can be also connected to a sensor 2 mounted on another roadside device 100, or can be also connected to a sensor 2 (not illustrated) mounted on the vehicle 3. The sensor 2 mounted on the vehicle 3 detects information on the vehicle 3, and outputs the detected information on the vehicle 3 to the map generation device 1 as information for dynamic map generation. The information on the vehicle 3 includes information that can identify the type of the vehicle 3, position information of the vehicle 3, information regarding the moving velocity of the vehicle 3, and the like. The position information of the vehicle 3 includes, for example, information regarding the position of the vehicle 3 in the three-dimensional space and information regarding the height of the vehicle 3. The position of the vehicle 3 in the three-dimensional space is represented by a so-called world coordinate system. The height of the vehicle 3 is represented by, for example, a value of z coordinate in m units in a so-called world coordinate system indicating the position of the vehicle 3. The moving velocity of the vehicle 3 is represented by, for example, a direction in 16 directions (value of 0 to 15) and a speed per hour.

The information on the vehicle 3 is, in other words, dynamic information.

The vehicle 3 is an automatic driving vehicle, and performs automatic driving control using the dynamic map output from the map generation device 1.

As described above, the vehicle 3, more specifically, the sensor 2 mounted on the vehicle 3 outputs information on the vehicle 3 to the map generation device 1 as information for dynamic map generation.

Although only one vehicle 3 is illustrated in FIG. 1, the number of vehicles 3 is not limited to one. A plurality of vehicles 3 can be connected to the map generation device 1.

The control center 4 outputs all pieces of information regarding the road to the map generation device 1 as information for dynamic map generation. The all pieces of information regarding the road includes high-precision three-dimensional map information including road surface information, lane information, building position information, and the like, in other words, static information.

The road surface information includes, for example, information regarding a state of a road surface and information regarding unevenness of the road surface. The state of the road surface is represented by, for example, "0: dry", "1: wet", or "2: frozen". The unevenness of the road surface is represented by, for example, an unevenness width. Furthermore, the lane information includes, for example, information regarding the number of lanes and the presence or absence of intersections. The number of lanes is represented by, for example, a numerical value of 0 to 9. The presence or absence of the intersection is represented by, for example, "0: present" or "1: absent". The building position information includes, for example, information on a building position, the number of buildings arranged, and information on a building height. The position of the building is represented by a so-called world coordinate system. The number of buildings arranged is represented by an integer value, for example. The height of the building is represented by, for example, a value of z coordinate in m units in a so-called world coordinate system indicating the position of the building.

The web server 5 is included in a traffic information system (not illustrated) or in a weather information system (not illustrated), or the like, and outputs information regarding traffic and information regarding weather to the map generation device 1 as information for dynamic map generation. The information regarding traffic and the information regarding weather include semi-static information such as information regarding a schedule of traffic regulations, information regarding a schedule of road construction, and wide area weather forecast information, and semi-dynamic information such as accident information, traffic congestion information, traffic regulation information, road construction information, and narrow area weather forecast information.

The weather information including the wide area weather forecast information and the narrow area weather forecast information includes, for example, information regarding a weather condition, information regarding a rainfall amount, a snowfall amount, a wind direction, or information regarding wind strength. The information regarding the weather condition is represented by, for example, "0: sunny", "1: cloudy", "2: rainy", or "3: snowy". The rainfall amount and the snowfall amount are represented, for example, in units of mm. The information regarding the wind direction is represented by, for example, a value obtained by setting 16 directions to 0 to 15. The information regarding the wind strength is represented by a value of 0 to 17, for example.

Traffic congestion information, traffic regulation information, accident information, and information related to a schedule of road construction are represented by, for example, "0: present" or "1: absent".

Although only one Web server 5 is illustrated in FIG. 1, the number of Web servers 5 is not limited to one. A plurality of Web servers 5 can be connected to the map generation device 1.

As illustrated in FIG. 1, the map generation device 1 includes an identification unit 11, a first conversion unit 12, a storage unit 13, a tracking unit 14, a second conversion unit 15, a map generation unit 16, and a communication unit 17.

The identification unit 11 acquires information for dynamic map generation from the sensor 2. In addition, the identification unit 11 acquires information for dynamic map generation from the control center 4 and the Web server 5 via the communication unit 17. The identification unit 11 may acquire the information for dynamic map generation from the sensor 2 mounted on another roadside device 100 or the sensor 2 mounted on the vehicle 3 via the communication unit 17.

The identification unit 11 identifies whether or not the acquired information for dynamic map generation is information for dynamic map generation including three-dimensional information, and whether or not the acquired information for dynamic map generation is information for dynamic map generation regarding an object whose motion needs to be tracked. In the first embodiment, the three-dimensional information is assumed to be information indicating the height direction. Further, in the first embodiment, the term "motion" is assumed to be a motion of the object due to a change in position of the object.

More specifically, first, the identification unit 11 identifies whether the information for dynamic map generation acquired from the sensor 2 is dynamic information or static information. In a case where the information for dynamic map generation is information on a moving body that is a movable object detected by the sensor 2, in other words, an object whose position can change, the identification unit 11 identifies the information for dynamic map generation as dynamic information.

As described above, the dynamic information includes information regarding the height of the moving body.

In addition, a moving body, which is a movable object, is an object whose motion needs to be tracked when a dynamic map is generated. When the position of the object changes, the object needs to be reflected on the changed position on the dynamic map, and the dynamic map needs to be updated.

Therefore, the identification unit 11 identifies the information for dynamic map generation, which is dynamic information, output from the sensor 2 as information for dynamic map generation including three-dimensional information and information for dynamic map generation regarding an object whose motion needs to be tracked.

In the first embodiment, as described above, an object indicated by the dynamic information, in other words, an object that is a moving body detected by the sensor 2 and whose motion needs to be tracked is also referred to as a "tracking target object".

In a case where the information for dynamic map generation is information on a stationary object that is an object that cannot move detected by the sensor 2, in other words, an object whose position does not change, the identification unit 11 identifies the information for dynamic map generation as static information.

The static information includes information regarding the height of the stationary object, as described above.

However, the position of the stationary object basically does not change. A stationary object is an object whose motion does not need to be tracked when generating a dynamic map.

Therefore, the identification unit 11 identifies the information for dynamic map generation, which is static information, output from the sensor 2 as information for dynamic map generation including three-dimensional information and information for dynamic map generation regarding an object whose motion does not need to be tracked.

In addition, the identification unit 11 identifies the information for dynamic map generation acquired from the control center 4 as static information.

Note that the information for dynamic map generation acquired from the control center 4 includes the high-precision three-dimensional map information as described above, and the high-precision three-dimensional map information includes all pieces of information regarding the road. The information on the road also includes information on the stationary object detected by the sensor 2. Although there is a possibility of overlapping with the "static information" acquired from the control center 4, in the first embodiment, it is assumed that the "static information" is also acquired from the sensor 2.

The identification unit 11 identifies the information for dynamic map generation, which is static information, output from the control center 4 as information for dynamic map generation including three-dimensional information and information for dynamic map generation regarding an object whose motion does not need to be tracked.

In addition, the identification unit 11 identifies whether the information for dynamic map generation acquired from the Web server 5 is semi-static information or semi-dynamic information. More specifically, the identification unit 11 identifies, in the information for dynamic map generation acquired from the Web server 5, information regarding a schedule of traffic regulations, information regarding a schedule of road construction, wide area weather forecast information, and the like as semi-static information. In addition, the identification unit 11 identifies, in the information for dynamic map generation acquired from the Web server 5, information regarding accident information, traffic congestion information, traffic regulation information, road construction information, narrow area weather forecast information, and the like as semi-dynamic information.

As described above, the semi-static information and the semi-dynamic information do not include the information regarding the height.

The semi-static information and the semi-dynamic information are not information regarding an object whose position changes. That is, the semi-static information and the semi-dynamic information are information regarding an event whose motion does not need to be tracked.

Therefore, the identification unit 11 identifies the information for dynamic map generation that is the semi-static information and the semi-dynamic information output from the Web server 5 as information for dynamic map generation that does not include three-dimensional information and information for dynamic map generation regarding an event whose motion does not need to be tracked.

When identifying whether or not the acquired information for dynamic map generation is information for dynamic map generation including three-dimensional information and whether or not the acquired information for dynamic map generation is information of an object whose motion needs to be tracked, the identification unit 11 extracts information at the timing of reflection on the dynamic map, and outputs the information to the first conversion unit 12.

At this time, the identification unit 11 assigns, to the information for dynamic map generation, a flag (hereinafter, referred to as a "three-dimensional information flag") indicating whether or not the information for dynamic map generation is information for dynamic map generation including three-dimensional information, a flag (hereinafter, referred to as a "tracking flag") indicating whether or not the information for dynamic map generation is information for dynamic map generation of an object that needs to be tracked, information (hereinafter referred to as "identification result information") indicating an identification result as to whether the information for dynamic map generation is dynamic information, semi-dynamic information, semi-static information, or static information, and information regarding a date and time when the information for dynamic map generation has been acquired, and outputs the information for dynamic map generation to the first conversion unit 12.

In the three-dimensional information flag, for example, "0: three-dimensional information is not included" or "1: three-dimensional information is included" is set. In the tracking flag, for example, "0: no tracking is required" or "1: tracking is required" is set. In the identification result information, for example, "1: dynamic information", "2: semi-dynamic information", "3: semi-static information", and "4: static information" are set.

Here, since it is assumed that the reflection timing of the dynamic information has come, the identification unit 11 assigns a three-dimensional information flag indicating that three-dimensional information is included, a tracking flag indicating that tracking is necessary, identification result information indicating that the object information is the dynamic information, and information regarding the date and time when the information for dynamic map generation has been acquired to the information for dynamic generation identified as the dynamic information, specifically, the object information related to the tracking target object, and outputs the object information to the first conversion unit 12.

The first conversion unit 12 converts the information for dynamic map generation output from the identification unit 11 from three-dimensional space information including information indicating the height direction into information for dynamic map generation (hereinafter, referred to as "information for map generation after two-dimensional conversion") that is two-dimensional space information not including information indicating the height direction.

Note that the first conversion unit 12 performs the above conversion on the information for dynamic map generation output from the identification unit 11 in a case where the information for dynamic map generation includes three-dimensional information and is information for dynamic map generation regarding an object that needs to be tracked. The first conversion unit 12 may determine whether or not the information for dynamic map generation includes three-dimensional information and is information for dynamic map generation regarding an object that needs to be tracked, from the three-dimensional information flag and the tracking flag assigned to the information for dynamic map generation.

Here, the information for dynamic map generation output from the identification unit 11 is information for dynamic map generation identified as dynamic information. A three-dimensional information flag indicating that three-dimensional information is included and a tracking flag indicating that tracking is necessary are assigned to the information for dynamic map generation. Specifically, the information for dynamic map generation is three-dimensional space information including position information (information regarding a position of the tracking target object in three-dimensional space and information regarding the height of the tracking target object) of the tracking target object. Therefore, the first conversion unit 12 performs the conversion.

In the first embodiment, the processing of converting the information for dynamic map generation, which is three-dimensional space information, into the information for dynamic map generation, which is two-dimensional space information, that is, the information for map generation after two-dimensional conversion, which is performed by the first conversion unit 12, is referred to as "first conversion processing".

In the first conversion processing, the first conversion unit 12 deletes the information indicating the height direction of the tracking target object from the information for dynamic map generation, thereby converting the information for dynamic map generation into the information for map generation after two-dimensional conversion. Specifically, with respect to the information for dynamic map generation, by deleting the z coordinate indicating the height direction of the tracking target object, the first conversion unit 12 converts the information for dynamic map generation, which is three-dimensional space information, into the information for map generation after two-dimensional conversion, which is two-dimensional space information.

Then, the first conversion unit 12 assigns the three-dimensional information flag, the tracking flag, the identification result information, and the information regarding the date and time when the information for dynamic map generation has been acquired to the information for map generation after two-dimensional conversion as the two-dimensional space information, and outputs the information to the tracking unit 14. The first conversion unit 12 may use the three-dimensional information flag, the tracking flag, the identification result information, and the information regarding the date and time when the information for dynamic map generation has been acquired as information assigned to the information for dynamic map generation output from the identification unit 11.

Furthermore, in the first conversion processing, the first conversion unit 12 stores information indicating the deleted height direction (hereinafter, referred to as "height information at the time of conversion"), specifically, here, the deleted z coordinate, in the storage unit 13. At this time, the first conversion unit 12 stores, in the storage unit 13, the height information at the time of conversion in association with information (ID) capable of identifying the tracking target object, information regarding the date and time when the first conversion processing has been performed, and the three-dimensional information flag, the tracking flag, the identification result information, and the information regarding the acquisition date and time of the information for dynamic map generation assigned to the information for dynamic map generation that is the conversion source to the information for map generation after two-dimensional conversion. It is assumed that information (ID) capable of identifying the object is assigned to the object detected by the sensor 2.

Here, the first conversion unit 12 does not need to store the height information at the time of conversion in the storage unit 13 every time the first conversion processing is performed.

For example, the first conversion unit 12 stores the height information at the time of conversion in the storage unit 13 every time a preset period (hereinafter, referred to as a "height updating period") elapses.

Since the position of the tracking target object can change with the lapse of time, when reflecting the information for dynamic map generation regarding the tracking target object, that is, the dynamic information in the dynamic map, it is necessary to track the tracking target object every time the information for dynamic map generation is acquired at the timing of reflecting the information for dynamic map generation in the dynamic map. On the other hand, it is assumed that the height of the tracking target object is basically unchanged. For example, the height of the vehicle 3 does not change over time. Therefore, the first conversion unit 12 does not necessarily store the height information at the time of conversion in the storage unit 13 every time the first conversion processing is performed. However, for example, a person riding on a bicycle may get off the bicycle and start walking. In this case, the height of the person may change. Similarly, for example, a person who has been squatting may rise. Further, the position information of the tracking target object previously detected by the sensor 2 may be erroneous.

Therefore, when the height update period has elapsed, the first conversion unit 12 determines that there may be a change in the height information at the time of conversion, and stores the height information at the time of conversion in the storage unit 13.

Note that, even if the height update period has not elapsed, the first conversion unit 12 stores the height information at the time of conversion in the storage unit 13 in a case of performing the first conversion processing on the information for dynamic map generation regarding the tracking target object that has appeared for the first time at the timing when the information for dynamic map generation, here, the dynamic information, is reflected on the dynamic map. The first conversion unit 12 can determine whether or not the tracking target object is the first appearing tracking target object from information (ID) that can identify the already stored tracking target object associated with the height information at the time of conversion.

The first conversion unit 12 causes the storage unit 13 to store the information indicating the height direction of the tracking target object deleted when the information for dynamic map generation is converted into the information for map generation after two-dimensional conversion, that is, the height information at the time of conversion, every time the update period elapses, so that the processing related to the storage of the height information at the time of conversion in the storage unit 13 can be reduced to the minimum necessary number of times, and the processing load can be reduced.

The storage unit 13 stores the height information at the time of conversion.

In FIG. 1, the storage unit 13 is provided in the map generation device 1, but this is merely an example.

The storage unit 13 may be provided outside the map generation device 1 at a place that can be referred to by the map generation device 1.

The tracking unit 14 tracks the motion of the tracking target object in time series on the basis of the information for map generation after two-dimensional conversion output from the first conversion unit 12. In the first embodiment, the tracking unit 14 "tracks in time series" refers to following a change in position from the position of the tracking target object based on the latest information for map generation after two-dimensional conversion. Specifically, it is determined whether a certain tracking target object based on the immediate information for map generation after two-dimensional conversion is the same as a certain tracking target object based on the latest information for map generation after two-dimensional conversion, and when the certain tracking target object is the same, information that can be determined to be the same tracking target object (such as ID, here, the ID is an ID on the dynamic map) is assigned to the tracking target object. That is, for the tracking target object whose position may change, the same ID is assigned to the tracking target object determined to be the same for a long time.

Specifically, the tracking unit 14 stores, for example, the information for map generation after two-dimensional conversion output from the first conversion unit 12 in the buffer of the tracking unit 14. The tracking unit 14 is only required to store the information for map generation after two-dimensional conversion for a preset period in the buffer. The tracking unit 14 can track the motion of each tracking target object on the basis of the ID assigned to the tracking target object and the stored time-series information for map generation after two-dimensional conversion. In other words, the tracking unit 14 can track a change in the position of each tracking target object on the basis of the ID assigned to the tracking target object and the stored time-series information for map generation after two-dimensional conversion.

The tracking unit 14 tracks two-dimensional information, that is, a change in the position indicated by the x and y coordinates for each tracking target object. In other words, the tracking unit 14 tracks each tracking target object in a two-dimensional space.

The tracking unit 14 extracts the information for map generation after two-dimensional conversion regarding the tracking target object whose position has changed as a result of the tracking, and outputs the information for map generation after two-dimensional conversion to the second conversion unit 15. At this time, the tracking unit 14 may output the extracted information for map generation after two-dimensional conversion and the information indicating the amount of change in the position of the tracking target object to the second conversion unit 15 in association with each other.

Note that, in a case where the tracking target object first appears at the timing of generating the dynamic map, in other words, in a case where the information for map generation after two-dimensional conversion associated with the ID assigned to the tracking target object is not present in the stored time-series information for map generation after two-dimensional conversion, the tracking unit 14 assumes that the position of the tracking target object has changed.

The second conversion unit 15 refers to the height information at the time of conversion stored in the storage unit 13, and converts the information for map generation after two-dimensional conversion output from the tracking unit 14, more specifically, the information for map generation after two-dimensional conversion regarding the tracking target object whose position has changed, from the information for map generation after two-dimensional conversion, which is two-dimensional space information not including information related to the height, to information for dynamic map generation (hereinafter, referred to as "information for map generation after three-dimensional conversion"), which is three-dimensional space information including information related to the height.

The second conversion unit 15 converts the information for map generation after two-dimensional conversion into the information for map generation after three-dimensional conversion by adding information in the height direction of the tracking target object to the information for map generation after two-dimensional conversion. Specifically, the second conversion unit 15 adds the z coordinate indicating the height of the tracking target object to the information for map generation after two-dimensional conversion, thereby converting the two-dimensional space information into the three-dimensional space information.

The second conversion unit 15 can identify the z coordinate to be added by associating the information for map generation after two-dimensional conversion and the height information at the time of conversion with information (ID) that can identify the tracking target object.

In the first embodiment, processing performed by the second conversion unit 15 to convert information for dynamic map generation that is two-dimensional space information, that is, information for map generation after two-dimensional conversion, into information for dynamic map generation that is three-dimensional space information is referred to as "second conversion processing".

The second conversion unit 15 outputs the information for map generation after three-dimensional conversion, which is obtained by conversion into the information for dynamic map generation being three-dimensional space information, to the map generation unit 16.

The map generation unit 16 generates the dynamic map on the basis of the information for map generation after three-dimensional conversion output from the second conversion unit 15.

For example, it is assumed that the map generation device 1 is now generating a dynamic map of the third area, and the information for map generation after three-dimensional conversion is information for map generation after three-dimensional conversion related to an ordinary vehicle (ID001) as a tracking target object. In this case, the map generation unit 16 generates the dynamic map of the third area in which the ordinary vehicle (ID001) is reflected in the content indicated by the information for map generation after three-dimensional conversion.

For example, assuming that the position of the ordinary vehicle (ID001) indicated by the information for map generation after three-dimensional conversion is at the point of (20, 30) and the height of the ordinary vehicle (ID001) is 2.0 m, the map generation unit 16 updates the ordinary vehicle (ID001) to be an ordinary vehicle of 2.0 m at the point of (20, 30) on the dynamic map of the third area.

As a result, the position and height of the ordinary vehicle (ID001) are updated from the position and height reflected in the dynamic map before the update to the latest position and height. Note that the map generation unit 16 does not update, from the content reflected in the dynamic map, a moving body other than the tracking target object (the ordinary vehicle (ID001) in the above-described example) based on the information for map generation after three-dimensional conversion, in other words, a moving body determined not to move by the tracking unit 14.

Note that, here, the map generation unit 16 does not update the content reflected on the dynamic map for the moving body determined not to move by the tracking unit 14, but this is merely an example. For example, the tracking unit 14 may extract the information for map generation after two-dimensional conversion regarding all the tracking target objects including the moving body having no motion, the second conversion unit 15 may convert the information for map generation after two-dimensional conversion related to all the tracking target objects into the information for map generation after three-dimensional conversion and output the information for map generation after three-dimensional conversion to the map generation unit 16, and the map generation unit 16 may update, from the content reflected in the dynamic map, all the tracking target objects including the moving body determined not to move.

The map generation unit 16 outputs the generated dynamic map to the vehicle 3 via the communication unit 17.

The map generation unit 16 may output the generated dynamic map to the control center 4 via the communication unit 17.

In the control center 4, for example, a display control device (not illustrated) provided in the control center 4 causes a display device (not illustrated) provided in a control room or the like to display the dynamic map. For example, a user such as a controller checks the dynamic map by checking the display device.

Then, the user gives the optimum route instruction to the vehicle 3 by, for example, the arrangement of the objects in the dynamic map. For example, if the road is blocked by some obstacles, the user instructs the vehicle 3 to take another road.

Furthermore, the user can also use, for example, the dynamic map displayed on the display device for tracking the vehicle 3 and the like. For example, the user determines where the vehicle 3 that has entered the premises is parked, sends an instruction to another vehicle 3, and causes the other vehicle 3 to go to the place where the vehicle 3 is parked to collect baggage or a person.

The communication unit 17 performs communication according to a standard such as 5G (5th Generation) or LTE (Long Term Evolution).

The communication unit 17 acquires information for dynamic map generation from the control center 4, the Web server 5, or the like, and outputs the information for dynamic map generation to the identification unit 11.

In addition, the communication unit 17 outputs the dynamic map generated by the map generation unit 16 to the vehicle 3 or the control center 4.

The communication unit 17 can also output the route information of the vehicle 3 calculated and output by the control center 4 to the vehicle 3. For example, in the control center 4, as a result of checking the dynamic map, the user sets the optimal route of the vehicle 3 according to the arrangement of the object, and outputs the set route information to the vehicle 3 via the communication unit 17, thereby instructing the optimal route. For example, when a road is blocked by some obstacle, the user sets an optimal route of the vehicle 3 so as to pass another road, and outputs the set route information to the vehicle 3 via the communication unit 17.

Furthermore, the communication unit 17 can also output various instructions for the vehicle 3 output from the control center 4 to the instructed vehicle 3. For example, in the control center 4, when the user tracks the vehicle 3 and the like on the basis of the dynamic map and determines where the vehicle 3 that has entered the premises is parked, the user outputs an instruction to go to another vehicle 3 and collect baggage or a person to another vehicle 3 via the communication unit 17.

An operation of the map generation device 1 according to the first embodiment will be described.

Figure 3:
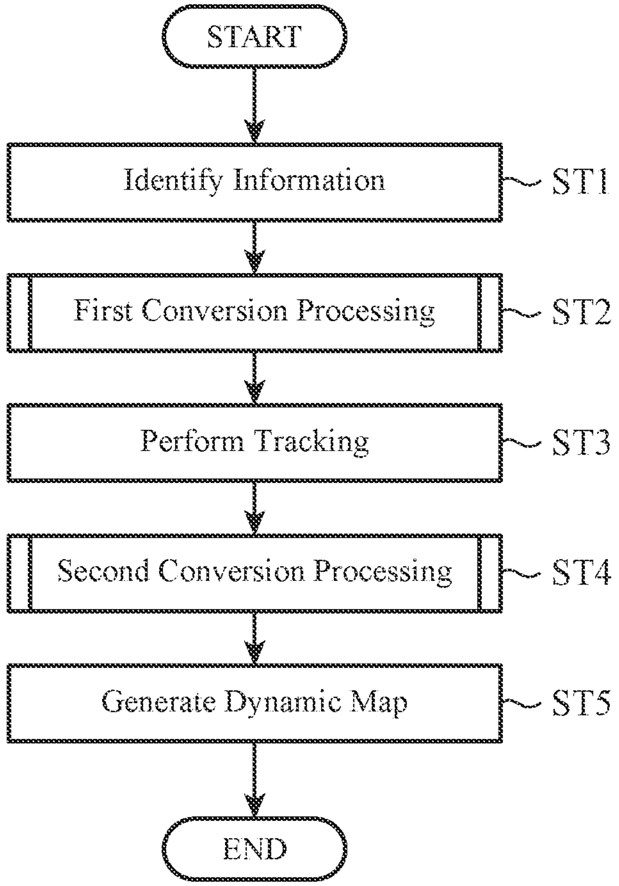
FIG. 3 is a flowchart for explaining an operation of the map generation device according to the first embodiment.

FIG. 3 is a flowchart for explaining the operation of the map generation device 1 according to the first embodiment.

The map generation device 1 repeats the operation as illustrated in the flowchart of FIG. 3 at each timing of generating the dynamic map.

Note that, here, the operation of the map generation device 1 will be described assuming that the reflection timing of the dynamic information has come in the map generation device 1.

The identification unit 11 acquires information for dynamic map generation from the sensor 2. In addition, the identification unit 11 acquires information for dynamic map generation from the control center 4 and the Web server 5 via the communication unit 17. The identification unit 11 may acquire the information for dynamic map generation from the sensor 2 mounted on another roadside device 100 or the sensor 2 mounted on the vehicle 3 via the communication unit 17.

Then, the identification unit 11 identifies whether or not the acquired information for dynamic map generation is information for dynamic map generation including three-dimensional information and whether or not the acquired information for dynamic map generation is information for dynamic map generation regarding an object whose motion needs to be tracked (step ST1).

After performing the identification, the identification unit 11 extracts information that has reached the timing of reflection on the dynamic map, that is, information for dynamic map generation that is dynamic information, and outputs the extracted information to the first conversion unit 12.

The first conversion unit 12 performs the first conversion processing (step ST2).

The first conversion unit 12 outputs the information for map generation after two-dimensional conversion to the tracking unit 14 and stores the height information at the time of conversion in the storage unit 13.

The tracking unit 14 tracks the motion of the tracking target object in time series on the basis of the information for map generation after two-dimensional conversion output from the first conversion unit 12 in step ST2 (step ST3).

The tracking unit 14 extracts the information for map generation after two-dimensional conversion regarding the tracking target object whose position has changed as a result of the tracking, and outputs the information for map generation after two-dimensional conversion to the second conversion unit 15.

The second conversion unit 15 performs the second conversion processing (step ST4).

The second conversion unit 15 outputs the information for map generation after three-dimensional conversion to the map generation unit 16.

The map generation unit 16 generates the dynamic map on the basis of the information for map generation after three-dimensional conversion output from the second conversion unit 15 in step ST4 (step ST5).

The map generation unit 16 outputs the generated dynamic map to the vehicle 3 via the communication unit 17.

The map generation unit 16 may output the generated dynamic map to the control center 4 via the communication unit 17.

Figure 4:
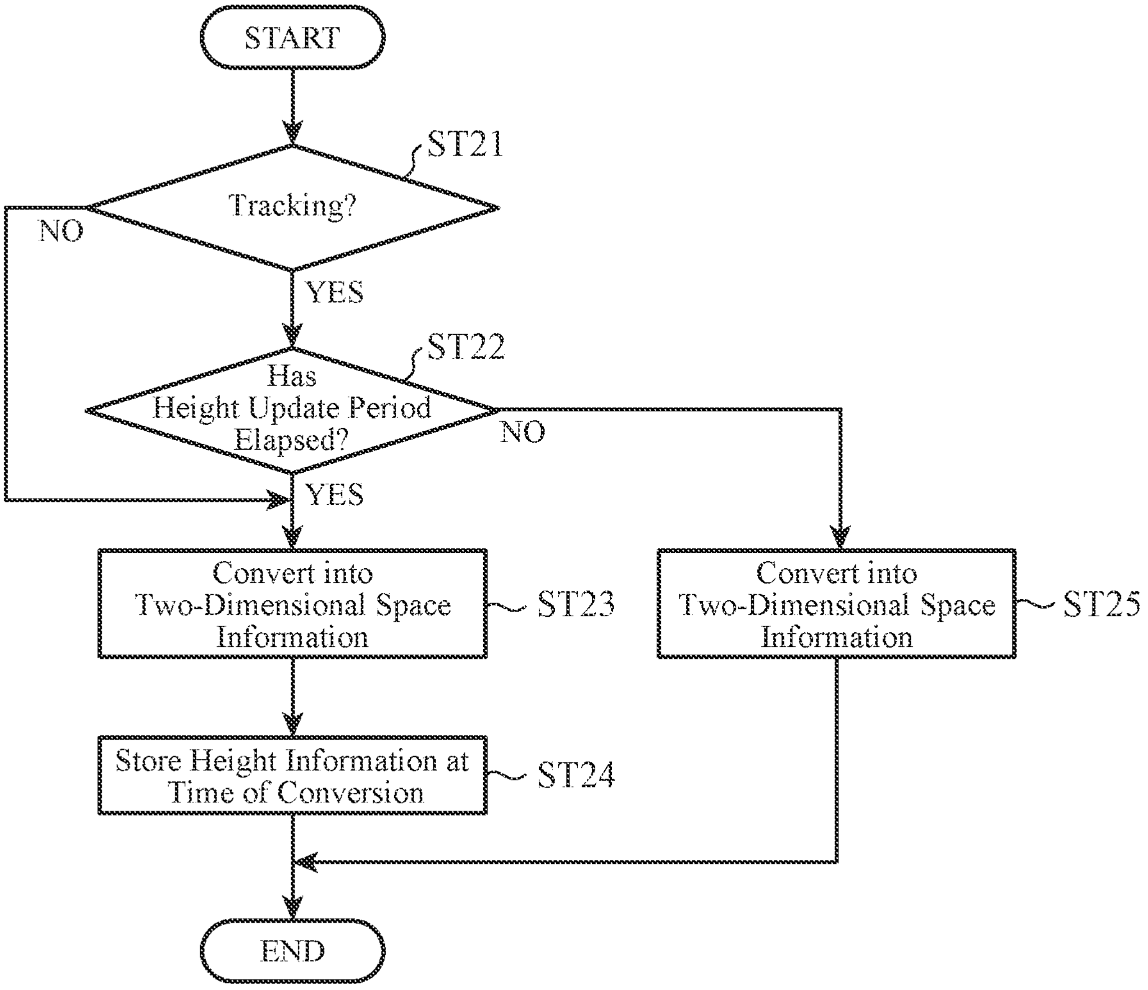
FIG. 4 is a flowchart for explaining details of processing of step ST2 in FIG. 3.

FIG. 4 is a flowchart for explaining details of the processing of step ST2 in FIG. 3.

The first conversion unit 12 determines whether or not the tracking target object is being tracked (step ST21). That is, the first conversion unit 12 determines whether or not the information for dynamic map generation output from the identification unit 11 in step ST1 of FIG. 3 is the information for dynamic map generation regarding the tracking target object that has appeared for the first time at the timing when the information for dynamic map generation, here, the dynamic information is reflected on the dynamic map.

When the tracking target object is being tracked (in the case of "YES" in step ST21), in other words, when the information for dynamic map generation output from the identification unit 11 in step ST1 of FIG. 3 is not the information for dynamic map generation regarding the tracking target object that has appeared for the first time at the timing when the information for dynamic map generation, here, the dynamic information is reflected on the dynamic map, the first conversion unit 12 determines whether or not the height update period has elapsed (step ST22).

When the height updating period has elapsed (in the case of "YES" in step ST22) and when it is determined that the tracking target object is not being tracked in step ST21 (in the case of "NO" in step ST21), in other words, when the information for dynamic map generation output from the identification unit 11 in step ST1 of FIG. 3 is the information for dynamic map generation regarding the tracking target object that has appeared for the first time at the timing when the information for dynamic map generation, here, the dynamic information is reflected on the dynamic map, the first conversion unit 12 converts the information for dynamic map generation from the information for dynamic map generation, which is three-dimensional space information, to the information for map generation after two-dimensional conversion, which is two-dimensional space information (step ST23). Then, the first conversion unit 12 assigns the three-dimensional information flag, the tracking flag, the identification result information, and information regarding the date and time when the information for dynamic map generation has been acquired to the information for map generation after two-dimensional conversion, and outputs the information to the tracking unit 14.

In addition, the first conversion unit 12 stores the height information at the time of conversion in the storage unit 13 (step ST24).

When it is determined that the height update period has not elapsed (in the case of "NO" in step ST22), the first conversion unit 12 converts the information for dynamic map generation from the information for dynamic map generation, which is three-dimensional space information, into the information for map generation after two-dimensional conversion, which is two-dimensional space information (step ST25), assigns the three-dimensional information flag, the tracking flag, the identification result information, and information regarding the date and time when the information for dynamic map generation has been acquired, to the information for map generation after two-dimensional conversion, and outputs the information for dynamic map generation to the tracking unit 14.

Note that the height information at the time of conversion stored in the storage unit 13 is initialized, for example, when generation of the dynamic map is completed or when the power supply of the map generation device 1 is turned off.

Figure 5:
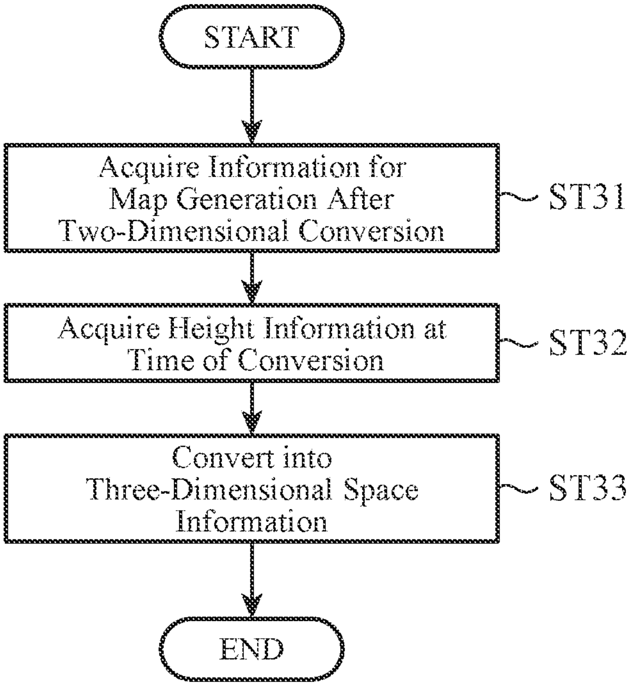
FIG. 5 is a flowchart for explaining details of processing of step ST4 in FIG. 3.

FIG. 5 is a flowchart for explaining details of the processing of step ST4 in FIG. 3.

The second conversion unit 15 acquires the information for map generation after two-dimensional conversion from the tracking unit 14 (step ST31).

The second conversion unit 15 acquires the height information at the time of conversion stored in the storage unit 13 (step ST32).

The second conversion unit 15 converts the information for map generation after two-dimensional conversion from the information for map generation after two-dimensional conversion to the information for map generation after three-dimensional conversion on the basis of the information for map generation after two-dimensional conversion acquired in step ST31 and the height information at the time of conversion acquired in step ST32 (step ST33).

The second conversion unit 15 outputs the information for map generation after three-dimensional conversion to the map generation unit 16.

Note that, in the flowchart of FIG. 5, after the processing of step ST31 is performed, the processing of step ST32 is performed, but this is merely an example.

For example, the order of the processing of step ST31 and the processing of step ST32 may be reversed, or the processing of step ST31 and the processing of step ST32 may be performed in parallel.

As described above, the map generation device 1 acquires the object information related to the object detected by the sensor 2 as the information for dynamic map generation, and identifies whether or not the acquired information for dynamic map generation is the information for dynamic map generation including three-dimensional information and whether or not the acquired information for dynamic map generation is the information for dynamic map generation regarding the tracking target object. The map generation device 1 converts the information for dynamic map generation identified as the information for dynamic map generation including three-dimensional information and the information for dynamic map generation regarding the tracking target object into the information for map generation after two-dimensional conversion which is two-dimensional space information, tracks the tracking target object in the two-dimensional space on the basis of the converted information for map generation after two-dimensional conversion, and extracts the information for map generation after two-dimensional conversion regarding the tracking target object that has moved. Then, the map generation device 1 converts the extracted information for map generation after two-dimensional conversion into information for map generation after three-dimensional conversion that is three-dimensional space information, and generates a dynamic map on the basis of the information for map generation after three-dimensional conversion.

As a result, the map generation device 1 can reduce the amount of information for tracking the motion of the object (tracking target object) that is detected by the sensor 2 and needs to be tracked in time series, and can reduce the tightness of the CPU processing capacity. As a result, the map generation device 1 can prevent generation and distribution of the dynamic map from being delayed. That is, the map generation device 1 can generate the dynamic map without impairing the real-time property. Then, the map generation device 1 can provide a dynamic map whose real-time property is not impaired.

Figure 6A:
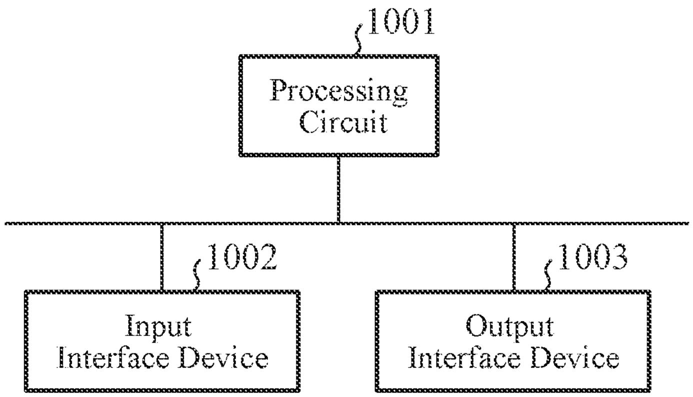
FIGS. 6A and 6B are diagrams each illustrating an example of a hardware configuration of the map generation device according to the first embodiment.
Figure 6B:
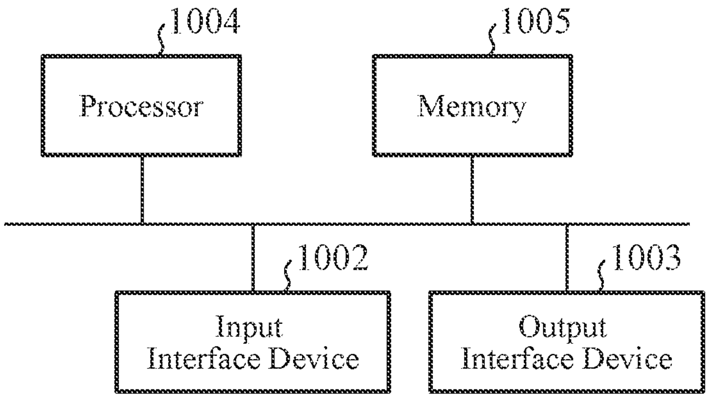

FIGS. 6A and 6B are diagrams illustrating an example of a hardware configuration of the map generation device 1 according to the first embodiment.

In the first embodiment, the functions of the identification unit 11, the first conversion unit 12, the tracking unit 14, the second conversion unit 15, and the map generation unit 16 are implemented by a processing circuit 1001. That is, the map generation device 1 includes the processing circuit 1001 for performing control to generate the dynamic map on the basis of the acquired information for dynamic map sensor generation.

The processing circuit 1001 may be dedicated hardware as illustrated in FIG. 6A or a processor 1004 that executes a program stored in a memory as illustrated in FIG. 6B.

In a case where the processing circuit 1001 is dedicated hardware, the processing circuit 1001 corresponds to, for example, a single circuit, a composite circuit, a programmed processor, a parallel programmed processor, an application specific integrated circuit (ASIC), a field-programmable gate array (FPGA), or a combination thereof.

In a case where the processing circuit is the processor 1004, the functions of the identification unit 11, the first conversion unit 12, the tracking unit 14, the second conversion unit 15, and the map generation unit 16 are implemented by software, firmware, or a combination of software and firmware. Software or firmware is written as a program and stored in a memory 1005. The processor 1004 reads and executes the program stored in the memory 1005, thereby executing the functions of the identification unit 11, the first conversion unit 12, the tracking unit 14, the second conversion unit 15, and the map generation unit 16. That is, the map generation device 1 includes the memory 1005 for storing a program that results in execution of the processing of steps ST1 to ST5 of FIG. 3 described above when executed by the processor 1004. It can also be said that the program stored in the memory 1005 causes a computer to execute a processing procedure or method performed in the identification unit 11, the first conversion unit 12, the tracking unit 14, the second conversion unit 15, and the map generation unit 16. Here, the memory 1005 corresponds to, for example, a nonvolatile or volatile semiconductor memory such as a RAM, a read only memory (ROM), a flash memory, an erasable programmable read only memory (EPROM), or an electrically erasable programmable read only memory (EEPROM), a magnetic disk, a flexible disk, an optical disk, a compact disk, a mini disk, a digital versatile disc (DVD), or the like.

Note that the functions of the identification unit 11, the first conversion unit 12, the tracking unit 14, the second conversion unit 15, and the map generation unit 16 may be partially implemented by dedicated hardware and partially implemented by software or firmware. For example, the functions of the identification unit 11 and the map generation unit 16 can be implemented by the processing circuit 1001 as dedicated hardware, and the functions of the first conversion unit 12, the tracking unit 14, and the second conversion unit 15 can be implemented by the processor 1004 reading and executing programs stored in the memory 1005.

The storage unit 13 includes, for example, a memory or the like.

In addition, the map generation device 1 includes an input interface device 1002 and an output interface device 1003 that perform wired communication or wireless communication with a device such as the sensor 2.

Note that, in the first embodiment described above, the generation of the dynamic map by the map generation device 1 has been described assuming that the reflection timing of the dynamic information has come, but for example, the map generation device 1 generates the dynamic map reflecting the semi-dynamic information in a case where the reflection timing of the semi-dynamic information has come, generates the dynamic map reflecting the semi-static information in a case where the reflection timing of the semi-static information has come, and generates the dynamic map reflecting the static information in a case where the reflection timing of the static information has come.

For example, in a case where the reflection timing of the semi-dynamic information has come, the identification unit 11 assigns a three-dimensional information flag indicating that three-dimensional information is not included, a tracking flag indicating that tracking is not necessary, identification result information indicating that the information is the semi-dynamic information, and information regarding the date and time when the information for dynamic map generation has been acquired to the information for dynamic map generation identified as the semi-dynamic information, in other words, information indicating accident information, traffic congestion information, traffic regulation information, road construction information, narrow area weather forecast information, and the like, and outputs the information to the first conversion unit 12.

In a case where the information for dynamic map generation output from the identification unit 11 is semi-dynamic information, the first conversion unit 12 outputs the information for dynamic map generation to the tracking unit 14 as it is without performing the first conversion processing. The accident information, the traffic congestion information, the traffic regulation information, the road construction information, the narrow area weather forecast information, and the like are all information that does not need to track the motion, and basically do not include information indicating the height direction. Therefore, the first conversion unit 12 does not perform the first conversion processing.

The tracking unit 14 outputs the information for dynamic map generation, which is the semi-dynamic information, specifically, the accident information, the traffic congestion information, the traffic regulation information, the road construction information, the narrow area weather forecast information, and the like, which are output from the first conversion unit 12, as they are to the map generation unit 16 via the second conversion unit 15.

The map generation unit 16 generates a dynamic map on the basis of the information for dynamic map generation output from the identification unit 11 via the first conversion unit 12, the tracking unit 14, and the second conversion unit 15. Note that the identification unit 11 may directly output the information for dynamic map generation to the map generation unit 16.

For example, also in a case where the reflection timing of the semi-static information has come, the map generation device 1 performs processing similar to the case where the reflection timing of the semi-dynamic information has come.

For example, when the reflection timing of the static information has come, the identification unit 11 assigns a three-dimensional information flag indicating that three-dimensional information is included, a tracking flag indicating that tracking is not necessary, identification result information indicating that the information is the static information, and information regarding the date and time when the information for dynamic map generation has been acquired to the information for dynamic generation identified as the static information, in other words, the high-precision three-dimensional map information and the object information related to the stationary object, and outputs the information to the first conversion unit 12.

When the information for dynamic map generation output from the identification unit 11 is static information, the first conversion unit 12 outputs the information for dynamic map generation to the tracking unit 14 as it is without performing the first conversion processing. Since both the high-precision three-dimensional map information and the object information related to the stationary object are information whose contents do not change with time, it is not necessary to track the motion when generating the dynamic map. Therefore, the first conversion unit 12 does not perform the first conversion processing. Note that the static information includes information indicating the height direction, but as described above, since the static information is information indicating the height direction of an object (building or the like) that does not need to be tracked, the first conversion unit 12 does not perform the first conversion processing.

The tracking unit 14 outputs the information for dynamic map generation, which is static information, specifically, the high-precision three-dimensional map information, and the object information related to the stationary object, which are output from the first conversion unit 12, as they are to the map generation unit 16 via the second conversion unit 15.

The map generation unit 16 generates a dynamic map on the basis of the information for dynamic map generation output from the identification unit 11 via the first conversion unit 12, the tracking unit 14, and the second conversion unit 15. Note that the identification unit 11 may directly output the information for dynamic map generation to the map generation unit 16.

In the first embodiment described above, the dynamic map is already present, but this is merely an example. The map generation device 1 may generate a new dynamic map.

In the first embodiment described above, the map generation device 1 is mounted on the roadside device 100, but this is merely an example.

For example, the map generation device 1 may be mounted on the sensor 2 or may be mounted on a server (not illustrated) connected to the sensor 2 by communication.

Furthermore, for example, a part of the identification unit 11, the first conversion unit 12, the tracking unit 14, the second conversion unit 15, or the map generation unit 16 may be included in the server.

As described above, according to the first embodiment, the map generation device 1 is configured to include: the identification unit 11 to acquire, from at least one sensor 2 that detects an object present in a target region, information on the object detected by the sensor 2 as information for dynamic map generation for generating a dynamic map, and identify whether or not the acquired information for dynamic map generation is the information for dynamic map generation including three-dimensional information and whether or not the acquired information for dynamic map generation is the information for dynamic map generation regarding a tracking target object whose motion needs to be tracked; the first conversion unit 12 to convert the information for dynamic map generation identified by the identification unit 11 as the information for dynamic map generation including the three-dimensional information and the information for dynamic map generation regarding the tracking target object into information for map generation after two-dimensional conversion that is two-dimensional space information; the tracking unit 14 to track the tracking target object in a two-dimensional space on the basis of the information for map generation after two-dimensional conversion converted by the first conversion unit 12 and extract the information for map generation after two-dimensional conversion regarding the tracking target object that has moved; the second conversion unit 15 to convert the information for map generation after two-dimensional conversion extracted by the tracking unit 14 into information for map generation after three-dimensional conversion that is three-dimensional space information; and the map generation unit 16 to generate the dynamic map on the basis of the information for map generation after three-dimensional conversion converted by the second conversion unit 15. Therefore, the map generation device 1 can reduce the amount of information for tracking the motion of the object that is detected by the sensor 2 and needs to be tracked in time series (tracking target object), and can reduce the tightness of the CPU processing capacity. As a result, the map generation device 1 can prevent generation and distribution of the dynamic map from being delayed. That is, the map generation device 1 can generate the dynamic map without impairing the real-time property.

Furthermore, in the present disclosure, any component of the embodiment can be modified, or any component of the embodiment can be omitted.

REFERENCE SIGNS LIST

100: roadside device, 1: map generation device, 11: identification unit, 12: first conversion unit, 13: storage unit, 14: tracking unit, 15: second conversion unit, 16: map generation unit, 17: communication unit, 2: sensor, 3: vehicle, 4: control center, 5: Web server, 1001: processing circuit, 1002: input interface device, 1003: output interface device, 1004: processor, 1005: memory

The invention claimed is:

1. A map generation device comprising processing circuitry to acquire, from at least one sensor that detects an object present in a target region, information on the object detected by the at least one sensor as information for dynamic map generation for generating a dynamic map, and identify whether or not the information for dynamic map generation acquired includes three-dimensional information and whether or not the information for dynamic map generation acquired is information regarding a tracking target object whose motion needs to be tracked, to convert, at least by removing a height dimension from the three-dimensional information, the information for dynamic map generation identified by the processing circuitry as the information for dynamic map generation including the three-dimensional information and the information for dynamic map generation regarding the tracking target object into information for map generation after two-dimensional conversion that is two-dimensional space information, to track the tracking target object in a two-dimensional space on a basis of the information for map generation after two-dimensional conversion converted by the processing circuitry and extract the information for map generation after two-dimensional conversion regarding the tracking target object that has moved, to convert, at least by re-adding the height dimension, the information for map generation after two-dimensional conversion extracted by the processing circuitry into information for map generation after three-dimensional conversion that is three-dimensional space information, and to generate the dynamic map on a basis of the information for map generation after three-dimensional conversion converted by the processing circuitry, wherein to convert, at least by re-adding the height dimension, the information for map generation after two-dimensional conversion extracted by the processing circuitry into information for map generation after three-dimensional conversion that is three-dimensional space information is based on determining that the tracking target object has moved in the meantime after converting the information for dynamic map generation identified by the processing circuitry as the information for dynamic map generation including the three-dimensional information and the information for dynamic map generation regarding the tracking target object into information for map generation after two-dimensional conversion that is two-dimensional space information.

2. The map generation device according to claim 1, wherein the processing circuitry further performs to convert the information for dynamic map generation into the information for map generation after two-dimensional conversion by deleting information indicating a height direction of the tracking target object from the information for dynamic map generation identified by the processing circuitry as the information for dynamic map generation including the three-dimensional information and the information for dynamic map generation regarding the tracking target object.

3. The map generation device according to claim 1, wherein the processing circuitry further performs to convert the information for map generation after two-dimensional conversion into the information for map generation after three-dimensional conversion by adding information in a height direction of the tracking target object to the information for map generation after two-dimensional conversion.

4. The map generation device according to claim 1, wherein the processing circuitry further performs to convert the information for dynamic map generation into the information for map generation after two-dimensional conversion by deleting information indicating a height direction of the tracking target object from the information for dynamic map generation identified by the processing circuitry as the information for dynamic map generation including the three-dimensional information and the information for dynamic map generation regarding the tracking target object, and store the information indicating the height direction of the tracking target object in a storage device, and to convert the information for map generation after two-dimensional conversion into the information for map generation after three-dimensional conversion by adding the information indicating the height direction of the tracking target object stored by the processing circuitry to the information for map generation after two-dimensional conversion.

5. The map generation device according to claim 4, wherein the processing circuitry further performs to cause the storage device to store, every time an update period elapses, the information indicating the height direction of the tracking target object that is deleted when the information for dynamic map generation is converted into the information for map generation after two-dimensional conversion.

6. A map generation system comprising:

a map generation device according to claim 1; and the at least one sensor to detect the object present in the target region.

7. The map generation device according to claim 1, wherein identifying whether or not the information for dynamic map generation acquired includes the three-dimensional information is based on acquiring a first flag and determining a value of the first flag indicating whether the information for dynamic map generation is the information for dynamic map generation including the three-dimensional information, and identifying whether or not the information for dynamic map generation acquired is the information regarding the tracking target object whose motion needs to be tracked is implemented by acquiring a second flag and determining a value of the second flag indicating whether the information for dynamic map generation is information for dynamic map generation of an object that is to be tracked.

8. The map generation device according to claim 1, wherein to convert, at least by re-adding the height dimension, the information for map generation after two-dimensional conversion extracted by the processing circuitry into information for map generation after three-dimensional conversion that is three-dimensional space information is based on determining that the tracking target object has changed height by at least one of standing from a squat position and dismounting from a bicycle in the meantime after converting the information for dynamic map generation identified by the processing circuitry as the information for dynamic map generation including the three-dimensional information and the information for dynamic map generation regarding the tracking target object into information for map generation after two-dimensional conversion that is two-dimensional space information.

9. The map generation device according to claim 1, wherein the tracking target object is a person, and the height dimension is indicative of a height of the person.

10. A non-transitory computer-readable storage medium storing a program for causing a computer to execute processing comprising:

acquiring, from at least one sensor that detects an object present in a target region, information on the object detected by the at least one sensor as information for dynamic map generation for generating a dynamic map, and identifying whether or not the information for dynamic map generation acquired includes three-dimensional information and whether or not the information for dynamic map generation acquired is information regarding a tracking target object whose motion needs to be tracked;

converting, at least by removing a height dimension from the three-dimensional information, the information for dynamic map generation identified as the information for dynamic map generation including the three-dimensional information and the information for dynamic map generation regarding the tracking target object into information for map generation after two-dimensional conversion that is two-dimensional space information;

tracking the tracking target object in a two-dimensional space on a basis of the information for map generation after two-dimensional conversion and extract the information for map generation after two-dimensional conversion regarding the tracking target object that has moved;

converting, at least by re-adding the height dimension, the information for map generation after two-dimensional conversion extracted into information for map generation after three-dimensional conversion that is three-dimensional space information; and generating the dynamic map on a basis of the information for map generation after three-dimensional conversion, wherein converting, at least by re-adding the height dimension, the information for map generation after two-dimensional conversion extracted by the processing circuitry into information for map generation after three-dimensional conversion that is three-dimensional space information is based on determining that the tracking target object has moved in the meantime after converting the information for dynamic map generation identified by the processing circuitry as the information for dynamic map generation including the three-dimensional information and the information for dynamic map generation regarding the tracking target object into information for map generation after two-dimensional conversion that is two-dimensional space information.

11. A map generation device comprising processing circuitry to acquire, from at least one sensor that detects an object present in a target region, information on the object detected by the at least one sensor as information for dynamic map generation for generating a dynamic map, and identify whether or not the information for dynamic map generation acquired includes three-dimensional information and whether or not the information for dynamic map generation acquired is information regarding a tracking target object whose motion needs to be tracked, to convert, at least by removing a height dimension from the three-dimensional information, the information for dynamic map generation identified by the processing circuitry as the information for dynamic map generation including the three-dimensional information and the information for dynamic map generation regarding the tracking target object into information for map generation after two-dimensional conversion that is two-dimensional space information, to track the tracking target object in a two-dimensional space on a basis of the information for map generation after two-dimensional conversion converted by the processing circuitry and extract the information for map generation after two-dimensional conversion regarding the tracking target object that has moved, to convert, at least by re-adding the height dimension, the information for map generation after two-dimensional conversion extracted by the processing circuitry into information for map generation after three-dimensional conversion that is three-dimensional space information, and to generate the dynamic map on a basis of the information for map generation after three-dimensional conversion converted by the processing circuitry, wherein identifying whether or not the information for dynamic map generation acquired includes the three-dimensional information is based on acquiring a first flag and determining a value of the first flag indicating whether the information for dynamic map generation is the information for dynamic map generation including the three-dimensional information, and identifying whether or not the information for dynamic map generation acquired is the information regarding the tracking target object whose motion needs to be tracked is implemented by acquiring a second flag and determining a value of the second flag indicating whether the information for dynamic map generation is information for dynamic map generation of an object that is to be tracked.

12. The map generation device according to claim 11, wherein the tracking target object is a person, and the height dimension is indicative of a height of the person.

* * * * *